UNITED STATES PATENT OFFICE.

MICHAEL WEYERMANN, OF BAMBERG, GERMANY.

PROCESS FOR PRODUCING TASTELESS ROASTED MALT DECOCTIONS.

No. 805,607.  Specification of Letters Patent.  Patented Nov. 28, 1905.

Application filed May 13, 1902. Serial No. 107,160.

*To all whom it may concern:*

Be it known that I, MICHAEL WEYERMANN, a subject of the Emperor of Germany, residing at Bamberg, Bavaria, Germany, have invented a certain new and useful Process for Producing Tasteless Roasted Malt Decoctions, of which the following is a specification.

The object of my invention is the production of an aqueous malt solution without bitter or scorched flavor from which very dark beers may be produced without disagreeable flavor while the coloring properties of the colored malt are neither diminished nor affected. Heretofore this disagreeable flavor has been present even when colored malt with very little flavor was used, because of the large quantities required to impart the necessary dark color to the beer.

In carrying out my invention I add to the finely-crushed colored malt from five to ten per cent. of charcoal, according to the quality of the malt. Wood, animal, or any other charcoal produced by roasting or by destructive distillation of suitable substances may be used provided they contain no noxious substances soluble in water. For example, charcoal from bones or from red or yellow prussiate of potash (all of which are understood to be included in the word "charcoal") may be used.

The colored malt-groats and charcoal are boiled for about an hour in the proportion of one hundred liters of groats to three hundred liters of water. The decoction thus obtained is separated in any known manner from the colored malt-husks in a vat or in any vessel commonly employed for such purpose in breweries—*e. g.*, by filtering the wort through the husks contained therein after settling or by means of filtering-presses. The husks are then lixiviated with hot water.

Notwithstanding that the charcoal possesses the property of extracting coloring-matter from solutions my experience has demonstrated that when used in the proportion described it does not act appreciably upon the coloring-matter, but appears to have a much greater affinity for the matter which produces the objectionable flavors and will entirely remove them without destroying the value of the decoction as a coloring agent.

The coloring decoction may be added either to the mash or dried malt in the mash-tun or to the wort, or it may be filtered and concentrated into an extract. Of this extract such quantity may be added to beer as is necessary to impart the desired color.

A higher yield of extract may be obtained by rendering soluble by malt diastase the carbohydrates which are contained in colored malt. This may be effected as follows: About three hundred liters of water are mashed with one hundred liters of colored malt-groats. Very clear dry malt-groats rich in diastase are then added in the proportion of ten to fifteen per cent. of the colored malt-groats—*i. e.*, ten to fifteen liters. This mixture is heated continually while mashing up to the temperature at which maltose is formed—about 149° Fahrenheit. It is mashed for about an hour at this temperature and after the addition of the charcoal is boiled for about half an hour and is then treated, as has been described.

It is most advantageous to revivify the charcoal by heating it to red heat directly before use, as its activity is materially increased thereby.

In my experiments with colored malts of which the water decoctions possessed an intensely bitter and burnt flavor I have been able to entirely remove this flavor by my process without affecting the color.

What I claim as new, and desire to secure by Letters Patent, is as follows:

1. The herein-described process for producing aqueous tasteless colored malt solutions for manufacturing dark beer, which consists in mixing colored malt-groats, revivified wood, animal or other charcoal—containing no noxious substance soluble in water—and water in or about the proportions stated, then boiling said mixture and separating the decoction from the colored malt-husks.

2. The herein-described process for producing aqueous tasteless colored malt solutions for manufacturing dark beer, which consists in mixing colored malt-groats, revivified wood, animal or other charcoal—containing no noxious substance soluble in water—and water in or about the proportions stated, then boiling said mixture and separating the decoction from the colored malt-husks and further lixiviating the colored malt-husks with hot water.

3. The herein-described process for producing aqueous tasteless colored malt solutions for manufacturing dark beer, which consists in mixing colored malt-groats, revivified wood, animal or other charcoal—containing no noxious substance soluble in water—and water in or about the proportions stated, then boiling said mixture and separating the decoction from the colored malt-husks filtering the decoction, and concentrating the filtrate to an extract.

4. The herein-described process for producing aqueous tasteless colored malt solutions for manufacturing dark beer, which consists in mixing colored malt-groats, revivified wood, animal or other charcoal—containing no noxious substance soluble in water—and water in or about the proportions stated, then boiling said mixture and separating the decoction from the colored malt-husks adding the decoction to the wort, filtering the whole and concentrating the filtrate to an extract.

5. The herein-described process for producing aqueous tasteless colored malt solutions for manufacturing dark beer, which consists in mixing water and colored malt-groats and adding dry malt-groats rich in diastase in or about the proportions stated, mashing this mixture and heating it to about 150° Fahrenheit, adding wood, animal or other charcoal—containing no noxious substance soluble in water, then boiling this colored mash, and separating the decoction from the husks.

In testimony whereof I have hereunto set my hand in the presence of two witnesses.

MICHAEL WEYERMANN.

Witnesses:
LEONHARD PRECHTEL,
HERMANN WERNER.